March 23, 1965 H. RENKER ETAL 3,174,349
CHANGE GEAR TRANSMISSION SHIFTABLE UNDER LOAD
Filed Oct. 16, 1962 3 Sheets-Sheet 1

INVENTORS
Hansjörg Renker
Erwin Huber
BY

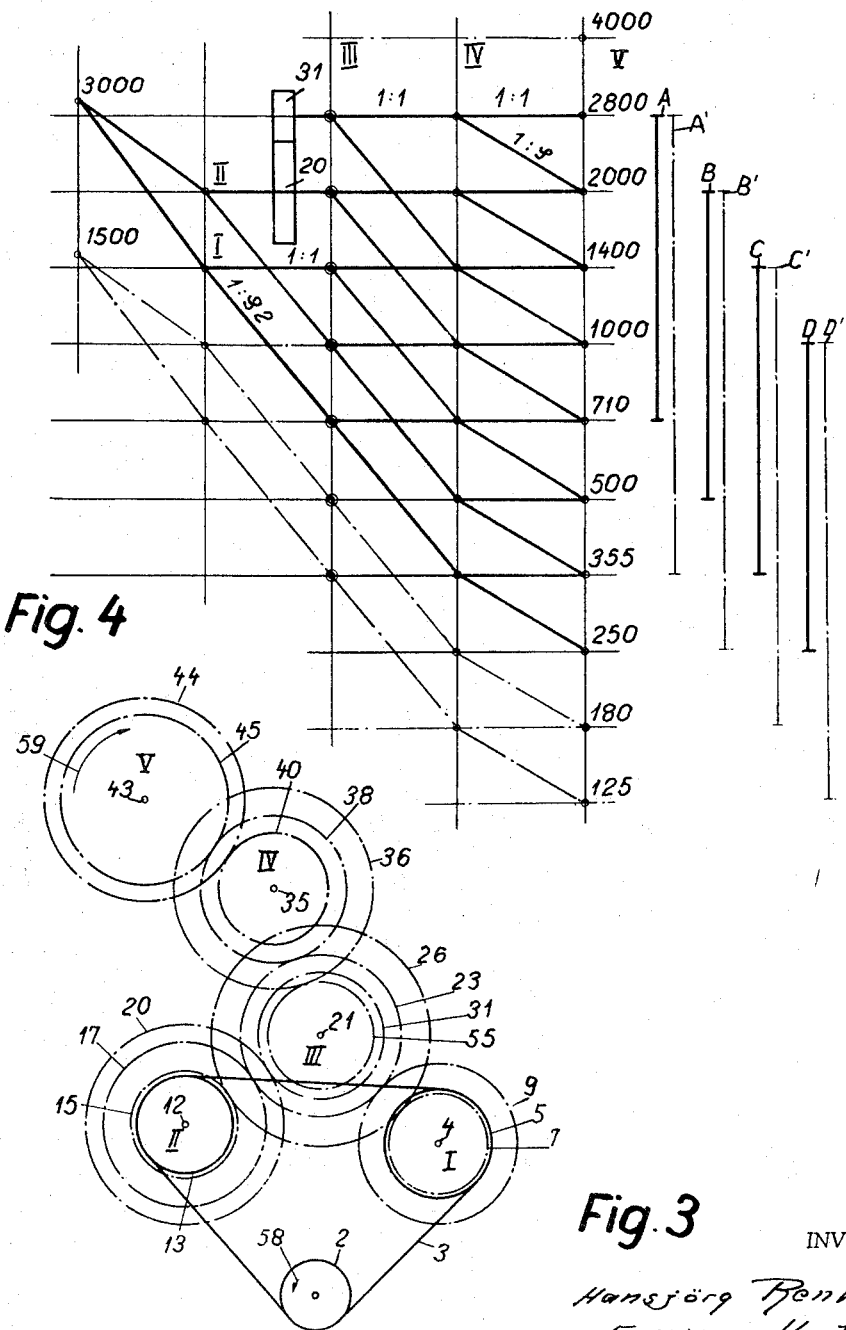

United States Patent Office 3,174,349
Patented Mar. 23, 1965

3,174,349
CHANGE GEAR TRANSMISSION SHIFTABLE UNDER LOAD
Hansjörg Renker and Erwin Huber, Schaffhausen, Switzerland, assignors to Georg Fischer Aktiengesellschaft, Schaffhausen, Switzerland
Filed Oct. 16, 1962, Ser. No. 230,876
Claims priority, application Switzerland, Oct. 20, 1961, 12,152/61
5 Claims. (Cl. 74—368)

The present invention relates to a stepped change gear transmission, especially for machine tools.

For purposes of economically employing cutting tools as, for instance, turning tools, it is nowadays imperative that at any time the respectively employed cutting material may work at those working conditions which are most favorable to the respective cutting material. Means to aid in this direction are formed on one hand by infinitely variable transmissions, and on the other hand by stepped change gear transmissions which are shiftable under load.

Heretofore known stepped change gear transmissions which are shiftable under load have the drawback that when changing from one speed to the next succeeding speed range, a jerky shifting occurs in view of the not absolutely timed coupling operation. Such jerky shifting may, under unfavorable circumstances, bring the working shaft to a standstill. It is for this reason that controls and means have been developed which, even at rather dis-uniform torque differences, permit a precise mutual tuning of the individual clutches or couplings. Such elements, which have to be provided when employing electrical as well as hydraulic couplings, however, greatly complicate the entire transmission construction and require a number of elements for the adjusting and mutual adaptation of the individual elements.

It is therefore an object of the present invention to provide a change gear transmission which will overcome the above-mentioned drawbacks.

It is another object of this invention to provide a change gear transmission which will be shiftable under load and, while it may have a great number of speed ranges, will be free from jerky shocks when being shifted.

These and other objects and advantages of the invention will appear more clearly from the following specification in connection with the accompanying drawings, in which:

FIGURE 1 diagrammatically illustrates a partial longitudinal section through a change gear transmission according to the invention;

FIGURE 3 is a diagrammatic cross-section through the change gear transmission of FIGURE 1;

FIGURE 4 illustrates a speed range diagram for the change gear transmission of FIGURE 1;

Figure 5:
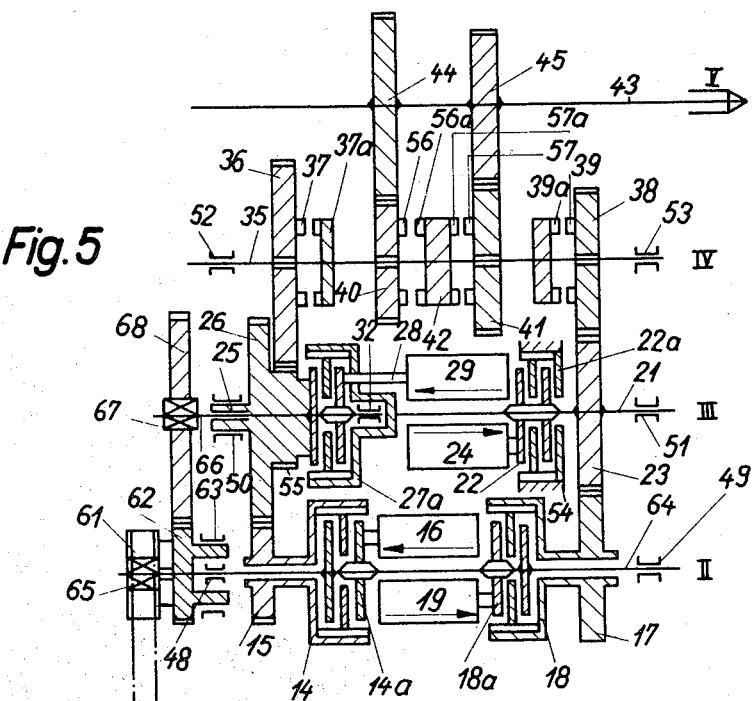
Figure 6:
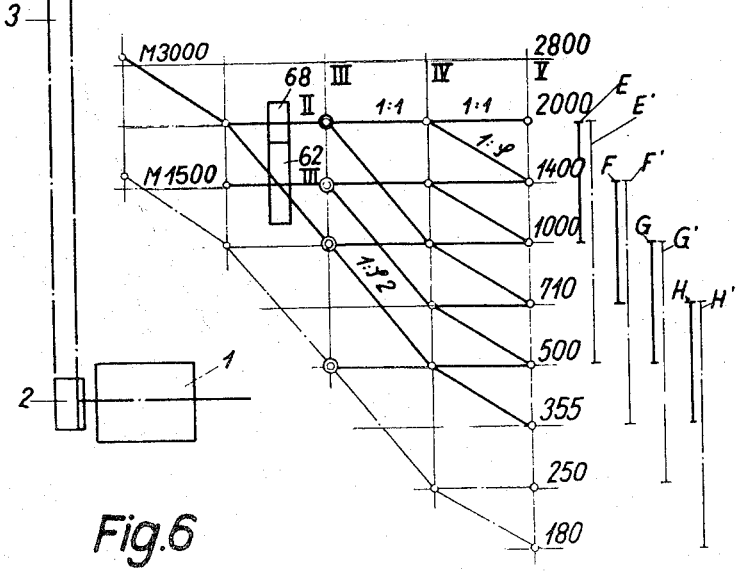

FIGURE 5 diagrammatically shows in longitudinal section a further embodiment of a transmission according to the invention;

FIGURE 6 illustrates a speed range diagram for the arrangement of FIGURE 5.

The transmission according to the present invention is characterized primarily in that at least one of the transmission shafts is equipped with two coupling elements and is driven at constant speed, whereas an additional transmission shaft is connected with a coupling and a brake while between said transmission shaft and the driving elements therefor there is each provided a free wheel overdrive coupling.

Referring now to the embodiment of FIGS. 1 to 4, the change gear transmission illustrated therein and shiftable under load represents an example with two intermediate shafts while the input shaft as well as the output shaft always turn in the same direction.

The arrangement shown in FIGS. 1 to 4 comprises a motor 1 having rotatably connected thereto a pulley 2 and operating, for instance, at a rated speed $n$ of approximately 3,000 r.p.m. The motor through toothed pulley 2 and toothed belt 3 drives two toothed pulleys 5 and 13 respectively, of different diameters. Preferably, the difference in diameter of said pulleys 5 and 13 is such that the speed difference of the two commonly driven shafts 4 and 12 will amount to approximately 1.41. This would be the case, if, for instance, shaft 4 rotates at $n$ equalling approximately 1400 r.p.m., and shaft 12 rotating at a speed $n$ of approximately 2,000 r.p.m. Mounted on shafts 4 and 12 respectively, for instance in the hubs of the pulleys 5 and 13, is a free wheel or overriding clutch 34 and 33, of any standard design.

If it is intended to employ the transmission alternately and selectively in one and thereupon in the opposite direction of rotation, likewise well-known free wheel or overriding clutch devices not illustrated in the drawings, would have to be employed.

Freely rotatably mounted on shaft 4 journalled in bearings 46 and 47 is a transmission wheel 7 with a clutch member 6, whereas the clutch member 6a pertaining thereto is keyed to shaft 4. By means of shifting elements 8, indicated diagrammatically only, clutch 6, 6a may be actuated while being under load. Also freely rotatably mounted on shaft 4 is a transmission wheel 9 with a clutch member 10, whereas the clutch member 10a pertaining thereto is keyed to shaft 4. The shifting member is designated with the reference numeral 11.

Mounted on shaft 12, which is journalled in bearings 48 and 49, is a gear 20 which is keyed to shaft 12. Furthermore, analogous to shaft 4, a gear 15 with a clutch member 14 is freely rotatably arranged, whereas a clutch member 14a is fixedly connected to shaft 12. Similarly, a gear 17 with a clutch member 18 is freely rotatable, and a clutch member 18a is keyed to shaft 12. The shift members pertaining to clutches 14, 14a and 18, 18a are designated with the reference numerals 16 and 19.

The arrangement furthermore comprises a braking member 22 which is fixedly connected to a shaft 21 journalled in bearings 51, 25 and 32. This braking member 22 is operable by shifting means 24 illustrated diagrammatically only. The second braking member 22a is fixedly arranged in the machine frame 54 likewise illustrated diagrammatically only. A gear 31 and a clutch member 27 are keyed to a shaft 30 journalled in bearings 50 and 32.

Figure 2:
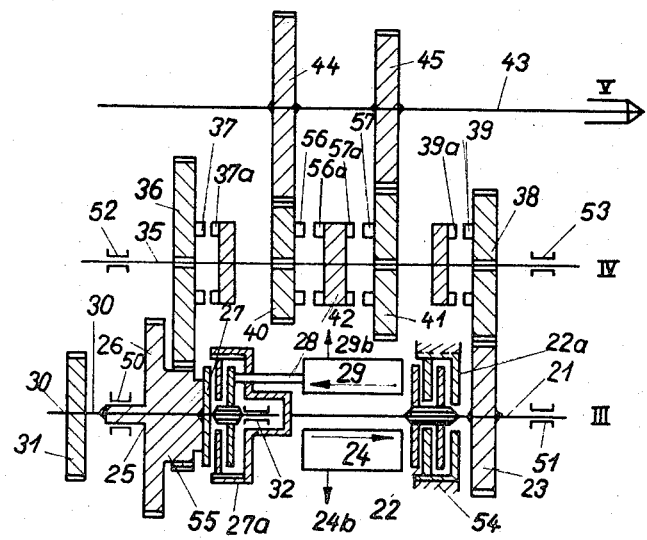
FIGURE 2 illustrates a change gear transmission according to FIGURE 1, partially in longitudinal section.

As will be evident from the drawing, gear 23 continuously meshes with gear 9 on shaft 4, with gear 17 on shaft 12, and with gear 38 on a countershaft 35 (see FIG. 2). Rotatably mounted on shaft 30 is a hollow shaft 25 with two gears 26 and 55 and with a clutch member 27 having a shifting member 24. As will be evident from the drawing, gear 26 continuously meshes with gear 7 on shaft 4 and with gear 15 on shaft 12. Gear 55 meshes with the gear 36 freely rotatably mounted on countershaft 35. The shifting members for clutch 27, 27a, and the brake 22, 22a are diagrammatically indicated by arrows carrying the reference numerals 24 and 29, respectively. As couplings or clutches 6, 10, 14, 18, 27, disc clutches may be provided which are adapted to be shifted during operation, i.e. under load. Similarly, the brake 22 could be designed as a disc brake.

As shifting members 8, 11, 16, 19, 24 and 29 for the clutches and for the brake, well-known suitable hydraulic, pneumatic, electric arrangements or combinations not shown in the drawing, may be employed.

On the countershaft 35 journalled in bearings 52 and 53, there is freely rotatably mounted a gear 36 having connected thereto a clutch member 37, while a clutch member 37a for cooperation with clutch member 37 is keyed to shaft 35. Similarly, the gear 38 has connected thereto a clutch member 39 and is freely rotatable on shaft 35, whereas a clutch member 39a is keyed to shaft 35 for cooperation with clutch member 38.

Freely rotatably mounted on countershaft 35 is a gear 40 equipped with a clutch member 56. Gear 40 meshes with a gear 44 which is fixedly connected to a working spindle 43. Similarly, a gear 41 equipped with a clutch member 57 is freely rotatably arranged on shaft 35 and meshes with a gear 45 keyed to the working spindle 43. Clutch members 56a and 57a for cooperation with clutch members 56 and 57 respectively form part of a coupling member 42 keyed to shaft 53. The working spindle 43 could, for instance, form the main spindle of a lathe. The journalling for said spindle 43 is not shown in the drawing. The clutch members 37, 39, 56 and 57 and the cooperating clutch members 37a, 39a, 56a and 57a form jaw clutches, which are not shiftable during the operation.

FIG. 3 diagrammatically illustrates the arrangement of the various shafts and indicates that the two shafts 4 and 12 as well as the countershaft 35 have approximately the same radial distance from shaft 21. This arrangement permits the employment of practically uniform gears or gear rings.

The direction of rotation of toothed pulley 2 and thereby of the drive motor 1 is indicated by an arrow 58, while the direction of rotation of gear 44 and thereby of the working spindle 43 is indicated by an arrow 59.

Figure 1:
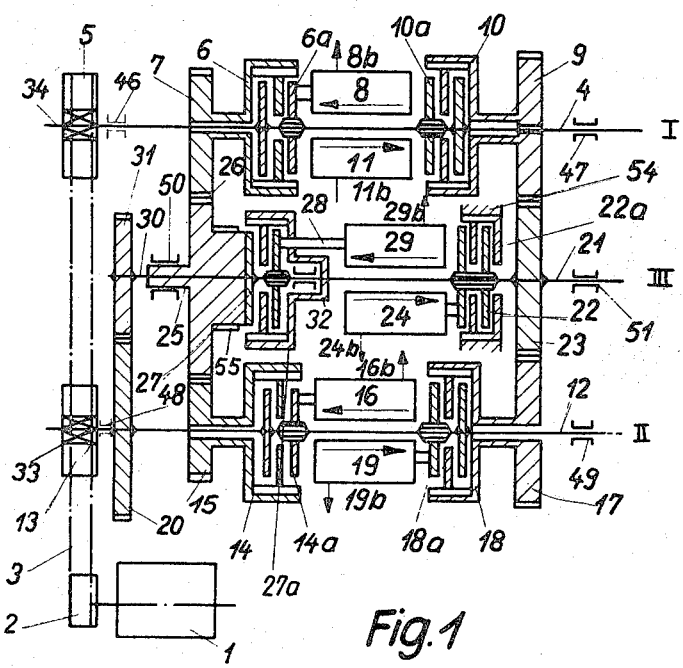

FIG. 4 illustrates the set-up diagram for the change gear transmission shiftable under load and illustrated in FIGS. 1 to 3. The heavy inclined lines illustrate the possible speed range, and the heavy vertical lines A, B, C and D illustrate the shift range of five speeds when employing a drive motor 1 with a rated speed of $n$ approximately equalling 3,000 r.p.m. The dot-dash inclined lines illustrate the possible speed range and the vertical dot-dash lines A', B', C', and D' illustrate the speed range shiftable under load of seven speeds when employing a reversible motor adapted selectively to operate at a rated speed of $n_1$ approximately equalling 3,000 r.p.m. and $n_2$ approximately equalling 1,500 r.p.m.

If, for instance, it is intended to operate while employing an ordinary motor with a speed $n$ approximately equalling 3,000 r.p.m. within the range A, i.e., $n$ approximately equalling from 710 to 2,800 r.p.m. (FIG. 4), first the clutches 39, 39a and 57, 57a which are not shiftable under load, are manually engaged (FIG. 2) thereby setting the respective range. Thereupon, by any suitable standard means (not shown) which may or may not be actuated by a control program, those couplings or clutches are actuated which correspond to the desired working spindle speed.

If it is intended to operate the shaft V (FIGS. 1 to 4) in the speed range A, for instance at a speed of about 710 revolutions per minute, clutches 39, 39a and 57, 57a are first closed. The clutch members 6, 6a, 27, 27a are closed and effective and the clutch members 10, 10a, 14, 14a and 18, 18a are open and ineffective. Thus the following parts operate in the following sequence:

Motor 1 drives shaft 4 via pulley 2, belt 3, pulley 5 and overrunning clutch 34. Shifting element 8 is energized to close clutch parts 6 and 6a while clutch parts 10 and 10a are open whereby gear 7 is driven to drive gear 26. Shifting element 29 is energized to close clutch parts 27 and 27a whereby shaft 21 and gear 23 are driven. Gear 23 drives gear 38 (FIGS. 2 and 5) and, through engaged clutch elements 39, 39a, shaft 35 is driven. Shaft 35 drives clutch part 42 which via clutch parts 57, 57a drives gear 41 meshing with gear 45 fixed to shaft 43 to be driven. Shaft 12 at this time runs idle.

To increase the speed of shaft V to the range of about 1000 r.p.m., clutch parts 14, 14a are closed by shifter element 16 while clutch parts 6, 6a are either open or closed.

The drive is then effected via the following parts in the order named: 1, 2, 3, 13, 33, 12, 14, 14a, 15, 26, 27, 27a, 21, 23, 38, 39, 39a, 35, 42, 57a, 47, 41, 45, 43. A step up in speed to about 1400 r.p.m. is to be made, clutch parts 10, 10a are closed by shifting means 11 and the drive is then effected via the following parts in the order named: 1, 2, 3, 5, 3, 4, 4, 10a, 10, 9, 23, 38, 39, 39a, 35, 42, 57a, 57, 41, 45, 43. Clutch parts 14, 14a may, at this time be opened, if desired.

To step the speed down under load from about 1400 r.p.m. to about 1000 r.p.m., clutch parts 14, 14a, if open, are closed and clutch parts 10, 10a are opened.

The foregoing shows how speed changes can be effected in part of the available speed ranges while shifting under load.

When shifting upwardly, i.e., from a lower speed range to the next successive higher speed, by means of any desired or standard control elements, the corresponding clutches are actuated for the said higher speed range while, in view of the above-mentioned free wheel or overriding clutches 33, 34, the transmission members of the lower speed range are able freely to rotate until the shifting elements thereof are actuated, i.e., are again disengaged. In this way, by employing very simple means, no temporary drop in the speed will occur when shifting from one speed range to another speed range, which fact will, of course, be beneficial to the operation of the machine.

When employing a pole reversible motor, it will be possible, with the same transmission illustrated in FIGS. 1 to 3, to obtain seven speed ranges shiftable under load, as has been illustrated in FIG. 4 by dot-dash lines. The range of the four steps A', B', C' and D' will then be increased to seven steps.

FIG. 5 diagrammatically illustrates a longitudinal section through a further embodiment of a transmission shiftable under load, in which, in contradistinction to the arrangement of FIGS. 1 to 4, one intermediate shaft only is employed.

In the arrangement of FIG. 5, those elements corresponding to respective elements in FIGS. 1 to 4 have been designated with the same reference numerals as in FIGS. 1 to 4 and will, therefore, not be repeated here.

As will be seen from FIG. 5 the drive motor 1 through the intervention of a toothed pulley 2 and a toothed belt 3 drives a toothed pulley 61 having fixedly connected thereto a gear 62. Gear 62 is supported by a bearing 63. Mounted on a shaft 64 journalled at 48 and 49 is a free wheel or overriding clutch 65 arranged within the toothed pulley 61. Furthermore, similar to the arrangement described in connection with FIGS. 1 and 2, clutch members 14a, 18a are keyed to shaft 64, whereas clutch member 14 with gear 15 and clutch member 18 with gear 17 are freely rotatable on shaft 64. The clutch shifting members are indicated by the arrows 16 and 19, respectively.

Shaft 21 with the clutch and brake means thereon partially corresponds to the corresponding arrangement of FIGS. 1 and 2. A shaft 66 journalled at 32 and 50 is adapted through the intervention of a free wheel coupling 67 to be drivingly connected to a gear 68 which meshes with gear 62 keyed to shaft 64 and is journalled at 63. Shafts 35 and 43 may be identical to the corresponding shafts in FIG. 2.

The speed range diagram of FIG. 6 illustrates the speed ranges E, F, G and H of each three successive speeds as they are obtainable with the device of FIG. 5 shiftable under load. The speed and speed ranges indicated by heavy lines apply when an ordinary motor with a rated speed of $n$ equalling approximately 3,000 r.p.m. is employed. This three-step change gear transmission shiftable under load may be converted into a five-step transmission shiftable under load when employing a pole reversible motor. This is indicated by the additional speed ranges illustrated in dot-dash lines. In this instance, four step ranges E', F', G' and H' of five successive speeds will be obtained.

Of course, it will also be possible by employing pulleys of different dimensions, to obtain any practical feasible displacement of the speed ranges shiftable under load, in upward or downward direction.

The braking members 22, 22a, 54 and 24 arranged on shaft 21 serve for braking and stopping the transmission.

The transmission illustrated in FIGS. 1 to 4 may easily be broadened by having the motor 1 drive not only two but three shafts simultaneously at different speeds. In this way, a seven-step under load shiftable transmission, and when employing a pole reversible motor, a nine-step under load shiftable transmission, will be obtained. This may be desirable when, for operational reasons a relatively low step is to be selected.

It is, of course, to be understood that the present invention is, by no means, limited to the particular constructions shown in the drawings, but also comprises any modifications within the scope of the appended claims.

What we claim is:

1. A stepped gear transmission shiftable under load, especially for machine tools, which includes: a first transmission shaft, a set of two clutches associated with said first transmission shaft, each of said clutches comprising a first clutch member keyed to said first transmission shaft and also including a second clutch member normally freely rotatable about said first transmission shaft but selectively engageable with said first clutch member, driving means drivingly connected to said first transmission shaft and operable to drive the same at a constant speed, a second transmission shaft, an additional clutch comprising an additional clutch member keyed to said second transmission shaft and also comprising another clutch member normally freely rotatable about said second transmission shaft and operable to engage with said additional clutch member, brake means associated with said additional transmission shaft and operable to brake the same, means drivingly connecting said second clutch members normally freely rotatable about said first transmission shaft with said other clutch member normally freely rotatable about said second transmission shaft, and over-riding clutch means interposed between and operatively connected to said first transmission shaft and the driving means therefor.

2. A stepped gear transmission shiftable under load, especially for machine tools, which includes: at least two transmission shafts, at least one set of two clutches associated with at least one of said two transmission shafts, each of said two clutches comprising a first clutch member keyed to the respective shaft with which it is associated and also including a second clutch member normally freely rotatable about said respective shaft but selectively engageable with said first clutch member, driving means drivingly connected to said transmission shafts and operable to drive at least one of said transmission shafts at a constant speed, an additional transmission shaft, an additional clutch comprising an additional clutch member keyed to said additional shaft and also comprising another clutch member normally freely rotatable about said additional shaft and operable to engage with said additional clutch member, brake means associated with said additional transmission shaft and operable selectively to brake the same, means drivingly connecting said clutch members which are normally freely rotatable about said first transmission shaft with said other clutch member, and over-riding clutch means interposed between and operatively connected to said first mentioned two transmission shafts and the driving means therefor.

3. An arrangement according to claim 2, in which both of the first-mentioned two transmission shafts have a set of two clutches associated therewith, and in which one clutch member of each of said sets of clutches is freely rotatable about the respective transmission shaft and is drivingly connected to the other clutch member of said additional transmission shaft.

4. A stepped gear transmission shiftable under load, especially for machine tools, which includes: a first transmission shaft, two clutches mounted on said first transmission shaft, each of said two clutches comprising a first clutch member normally freely rotatable about said first transmission shaft and also including a second clutch member keyed to said first transmission shaft, said first and second clutch members of each clutch being operable selectively to engage and disengage each other, a second transmission shaft comprising a third clutch having a third clutch member normally freely rotatable about said second transmission shaft and also having another clutch member keyed to said second transmission shaft and selectively engageable with and disengageable from said third clutch member, brake means mounted on said second transmission shaft and operable to brake the same, driving means for driving said first transmission shaft, a first overriding clutch interposed between and operatively connected to said driving means and to said first transmission shaft, transmission means drivingly connecting said first transmission shaft with said second transmission shaft, second overriding clutch means interposed between and operatively connected to said transmission means and to said second transmission shaft, means drivingly connecting one of said first clutch members with said third clutch member, and means drivingly connecting the other one of said first clutch members with said second transmission shaft.

5. An arrangement according to claim 4, which includes countershaft means and a shaft to be driven, first clutch elements normally freely rotatable about said countershaft and continuously drivingly connected to said first clutch members, second clutch elements selectively engageable with and disengageable from said first clutch elements at standstill of said first clutch elements only for drivingly connecting the latter with said countershaft, and additional clutch means operatively connected to said countershaft and to the shaft to be driven and operable selectively for drivingly connecting said countershaft with said shaft to be driven.

No references cited.

DON A. WAITE, *Primary Examiner.*